United States Patent [19]
Canzone

[11] Patent Number: 5,592,656
[45] Date of Patent: Jan. 7, 1997

[54] METHOD AND APPARATUS FOR PROCESSING MESSAGES HAVING ARBITRARY MESSAGE STRUCTURES WITH A MESSAGE PROCESSOR THAT IS CONDITIONED WITH A GRAPHICAL USER-DEFINED MESSAGE STRUCTURE

[75] Inventor: Jeanene D. Canzone, Pomona, Calif.

[73] Assignee: Hughes Aircraft Company, Los Angeles, Calif.

[21] Appl. No.: 361,909

[22] Filed: Dec. 21, 1994

Related U.S. Application Data

[63] Continuation of Ser. No. 114,260, Aug. 30, 1993, abandoned.

[51] Int. Cl.$^6$ .................................................. G06F 17/00
[52] U.S. Cl. .................................................. 395/680
[58] Field of Search .................................. 395/500, 700, 395/155, 156

[56] References Cited

U.S. PATENT DOCUMENTS

| | | | |
|---|---|---|---|
| 5,115,392 | 5/1992 | Takamoto et al. | 395/650 |
| 5,179,703 | 1/1993 | Evans | 395/700 |
| 5,187,788 | 2/1993 | Marmelstein | 395/700 |
| 5,261,042 | 11/1993 | Brandt | 395/156 |
| 5,283,887 | 2/1994 | Zachery | 395/500 |
| 5,285,387 | 2/1994 | Kurahara et al. | 364/419.09 |
| 5,297,286 | 3/1994 | Uehara | 395/700 |
| 5,339,434 | 8/1994 | Rusis | 395/700 |
| 5,450,545 | 9/1995 | Martin et al. | 395/700 |

OTHER PUBLICATIONS

"Defining Faster Transfer Syntaxes for the OSI Presentation Protocol", C. Huitema, pp. 44–55, vol. 19, No. 5, Oct. 1989, *Computer Commjnication Review*.

"The Design and Implementation of an ASN.1–C Compiler", G. W. Neufeld, pp. 1209–1220, vol. 10, No 10, Oct. 1990, *IEEE Transactions On Software Engineering*.

"Thinkpad: A Graphical System for Programming by Demonstration", R. Rubin, pp. 73–78, Mar. 1985, *IEEE Software*.

"DOD Changes Procurement Strategy for Software to Drive Command Centers", David Hughes, *Aviation Week & Space Technology*, Aug. 26, 1991, p. 56.

*Primary Examiner*—Kenneth S. Kim
*Attorney, Agent, or Firm*—G. S. Grunebach; M. W. Sales; W. K. Denson-Low

[57] ABSTRACT

A message processing system is conditioned to receive messages having a particular structure. A set of descriptors that define the message structure are inputted on a graphical display, and the graphical display is used to condition software that translates message structures to a form that is compatible with the message processing language. Changes in message structure are accommodated by simply inputting a new set of descriptors, without a need to know the message processing language. In one embodiment, message structures are defined by a plurality of fields, with descriptors defining the length and type of the fields, permissible values and fixed/variable length, optional, mandatory, and conditional selections.

16 Claims, 4 Drawing Sheets

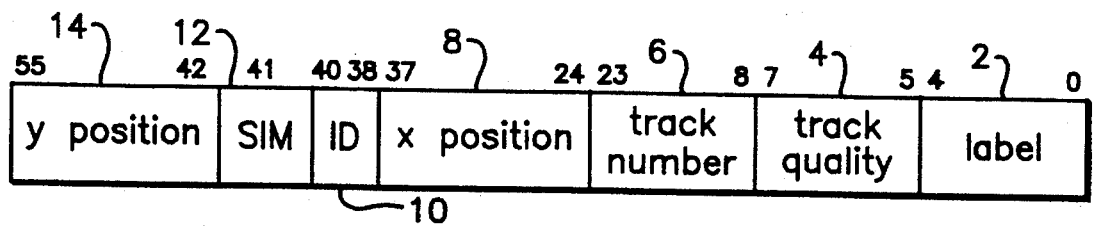

MESSAGE DEFINITION:

| Field | # Bits | Code |
|---|---|---|
| Label | 5 | 00011 |
| Track Quality | 3 | Single Numeric 1 to 7 |
| Track Number | 16 | See Track Number and Address Code Table |
| X Position | 14 | MSB=0, East; MSB=1, West; 13 bit position |
| ID | 3 | See ID Table |
| SIM | 1 | 0=Live Track, 1=SIM Track |
| Y Position | 14 | MSB=0, North; MSB=1, South; 13 bit position |

Fig.1

```
       M    OBJ_DEF      SOM
       M    OBJ_DEF      HEADER
       M    DSET    AIRTRKPOS           LABEL name
       {
              M    FLD     LBL          N+
              M    FLD     TRKQL        N+
              M    FLD     TRKNUM       N+
              M    FLD     XPOS         N+
              M    FLD     ID           N+
              M    FLD     SIM          N+
              M    FLD     YPOS         N+
       }              --end DSET  AIRTRKPOS
```

Fig.2

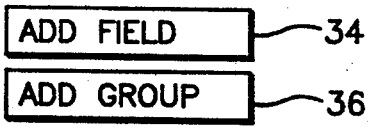

Fig.4

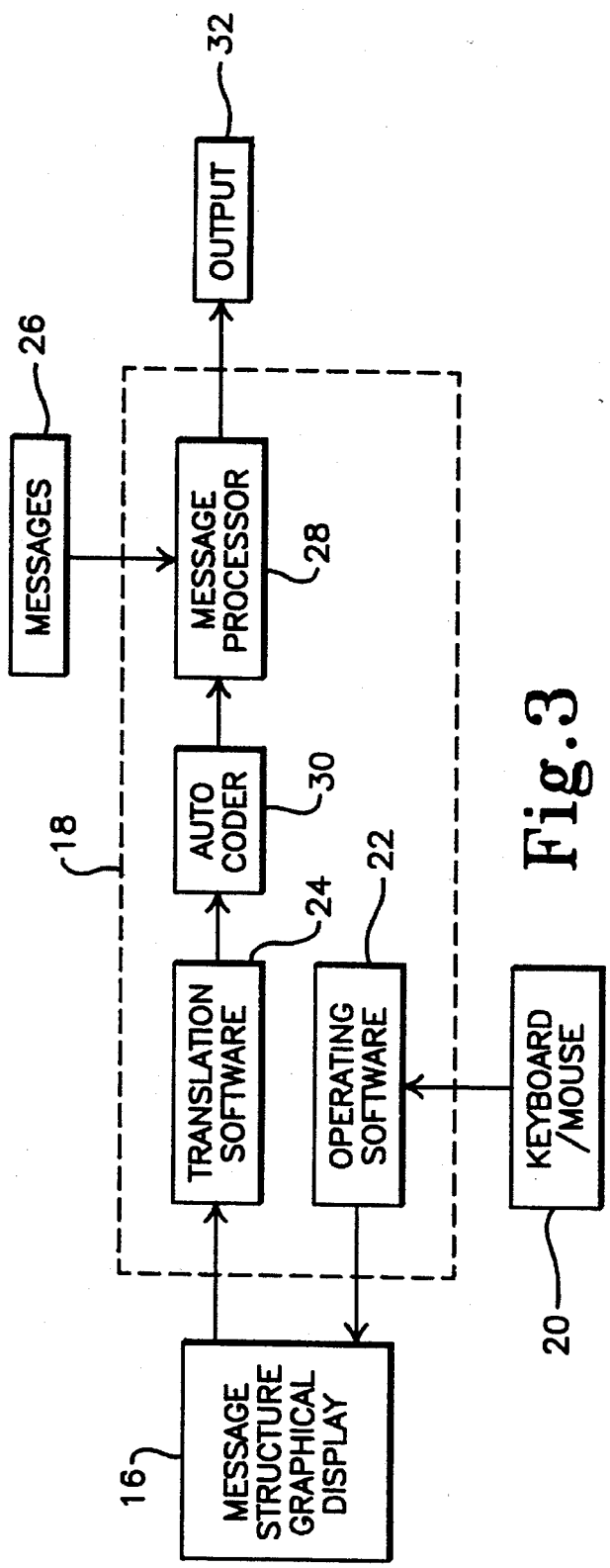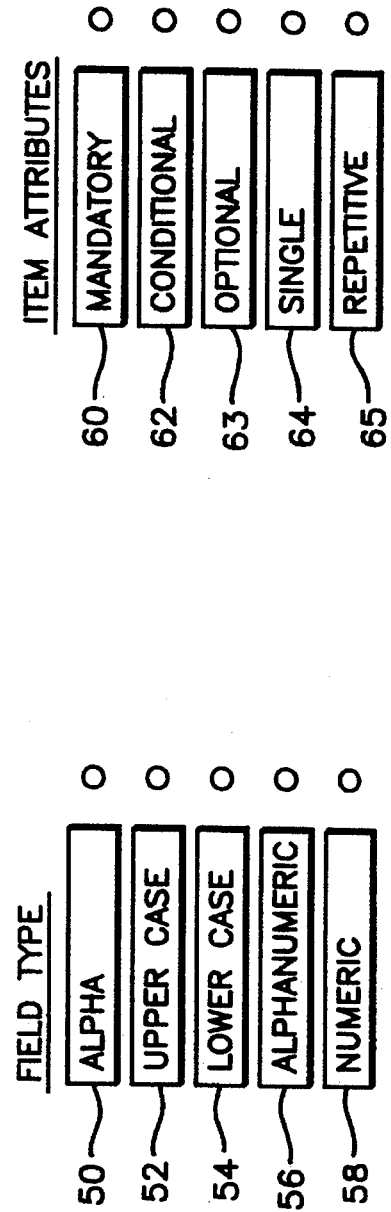

METHOD AND APPARATUS FOR PROCESSING MESSAGES HAVING ARBITRARY MESSAGE STRUCTURES WITH A MESSAGE PROCESSOR THAT IS CONDITIONED WITH A GRAPHICAL USER-DEFINED MESSAGE STRUCTURE

This is a continuation of application Ser. No. 08/114,260, filed Aug. 30, 1993, now abandoned.

BACKGROUND OF THE INVENTION

1. Field of the Invention

This invention relates to the treatment of message structures described to a message processor, and more particularly to a simplified intuitive method and apparatus for defining message structures to a processor in a manner that is compatible with the message processor language.

2. Description of the Related Art

Message processors are used in applications such as air traffic control and command to track a stream of incoming messages and provide for the control of a complex situation. For example, a message processor for an air traffic control system would receive periodically updated messages on the positions of numerous aircraft in the region, provide a visual display of all the aircraft positions and headings, and perhaps update a data base.

A message processor typically performs parsing, validating and translation functions in processing incoming and outgoing messages. The structure of the messages must be described to the message processor in advance, so that it can properly parse the messages. The language used by message processors is usually very complex, and can be difficult to use. To properly describe the message structure, it has been necessary to employ the services of an engineer who knows the message processor language to describe the message structure in a language that the message processor can understand. Because of the language complexity, this approach is prone to errors that can cause delays in time-critical schedules. The problem is aggravated by the frequent changes that are typically encountered in message structures.

FIG. 1 shows an example of a message specification that an engineer would have to describe in a language understood by the message processor. This message is for an air traffic control application, and is structured as follows:

LABEL 2 (5 bits): identifies the type of message.

TRACK QUALITY 4 (3 bits): assigns a degree of confidence to the information for the aircraft being tracked. The value of this descriptor goes down as the information from the tracking radar becomes less current.

TRACK NUMBER 6 (16 bits): identifies the particular aircraft being tracked.

X POSITION 8 (14 bits): the most significant bit of this descriptor identifies whether the aircraft position is East or West; the remaining 13 bits specify the aircraft position in the X direction.

ID 10 (3 bits): this descriptor is an aircraft identification category, such as "friend or foe".

SIM 12 (1 bit): indicates whether the track is for a live aircraft, or a simulation exercise.

Y POSITION 14 (14 bits): the most significant bit of this descriptor identifies whether the aircraft position is North and South; the remaining 13 bits specify the aircraft position in the Y direction.

FIG. 2 shows an example of the message specification of FIG. 1 described in a message processor language. It would be highly desirable to avoid the need for a trained engineer to make transformations of this type.

Simplified user interface tools have previously been used to describe a schema structure to a data base. Examples of such tools are 4th DIMENSION by ACIUS, Inc. and Fox-BASE+/Mac by Fox Software, Inc. These systems use a WINDOWS-type display on a computer screen that organizes the data base by the number of fields it contains, the types of fields, and similar information. The user types in the data base information directly, using the graphical display on the screen. However, this is simply a useful data base entry system for inputting information in a fixed format to a passive data base. It does not provide any means to establish the actual message structure (as opposed to the contents of the message) for a dynamic message processor that receives messages with numerous different types of structures.

SUMMARY OF THE INVENTION

The present invention seeks to provide a simplified method and corresponding apparatus for conditioning a message processor to process messages having different types of message structures. The new method is faster, more accurate and easier to use than the prior process that required a skilled engineer to describe the message structure in a language that the message processor can understand.

In the accomplishment of these goals, the invention uses a graphical interface, preferably a WINDOWS-type display with a "point and click" capability, to condition a message processing system so that it can process messages that have a predetermined message structure. The message structure is defined by a set of descriptors, which are inputted on the graphical display. The set of descriptors is used to code a software program that translates the defined message structure into a language that is compatible with the message processor language, which preferably employs an input auto coder.

In a preferred embodiment, the descriptor set defines the message structure in terms of a plurality of fields. The fields can be further defined in terms of length, type, permissible values and the existence of optional, mandatory, and/or conditional fields. For example, a length descriptor preferably allows for both fixed and variable length fields, while a field type descriptor can allow for variations such as upper case, lower case, mixed upper and lower case, numeric and alphanumeric fields.

Another application is for message processors that are organized by information templates and corresponding co-templates that validate the information contained in the information templates. In this application, the message structure descriptors are assigned to the co-templates.

By eliminating the need for a manual translation of message structure into a language that is usable by the message processor, the invention improves both the efficiency and accuracy of conditioning the message processing system to receive messages that have different types of structures. Converting from one message structure to another is quick and uncomplicated. These and further features and advantages of the invention will be apparent to those skilled in the art from the following detailed description, taken together with the accompanying drawings.

BRIEF DESCRIPTION OF THE DRAWINGS

FIG. 1 shows an example of a message specification, described above;

FIG. 2 shows an example of a message specification of FIG. 1 described in a machine processor language;

FIG. 3 is a block diagram of a message processing system that incorporates the invention;

FIG. 4 is a block diagram of the highest level message structuring options in accordance with a preferred embodiment of the invention;

FIG. 6 is a block diagram of possible options for structuring the field type;

FIG. 7 is a block diagram of possible options for structuring item attributes;

DETAILED DESCRIPTION OF THE INVENTION

Figure 5:
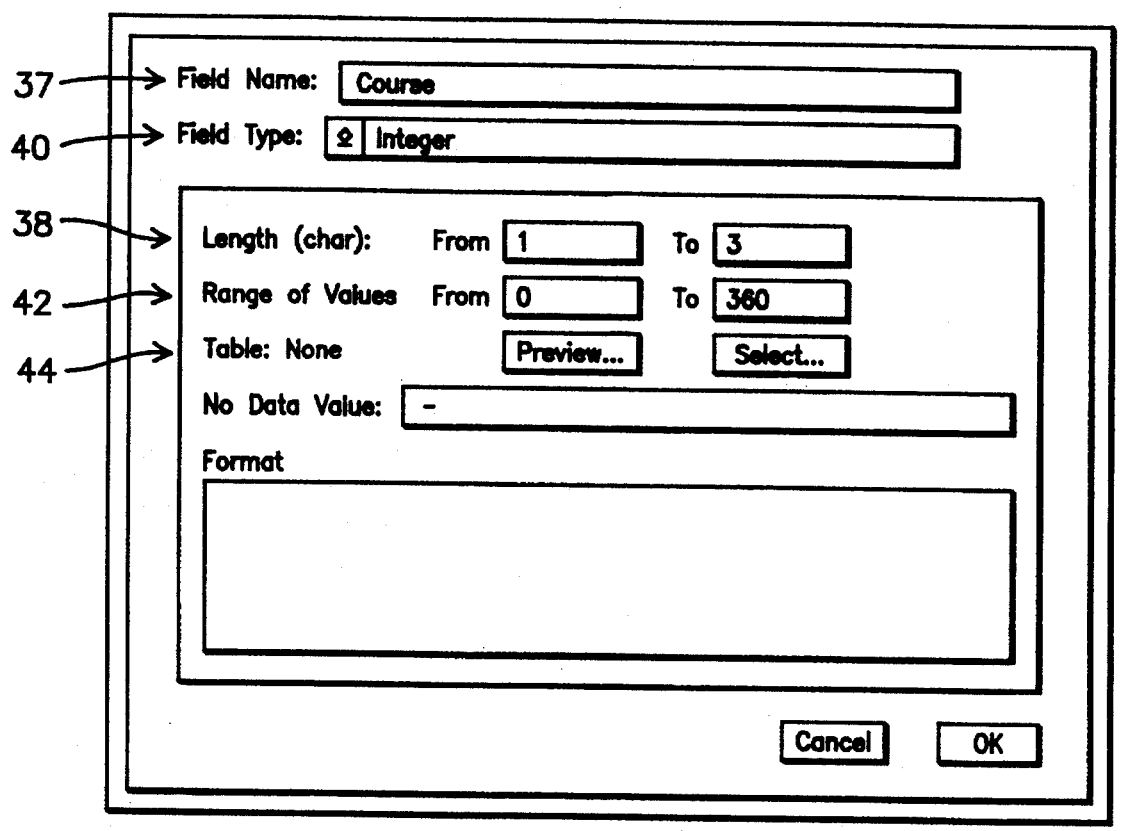
FIG. 5 shows a screen display with a graphical display of options for defining the structure of a message field.

The invention provides an intuitive user interface in which a graphical display is used to describe message structures, without the prior need for an engineer with a detailed knowledge of the message processor language. The development of a message specification is facilitated through "point and click" icons that help the operator specify an entire message, a group of data, character fields or bit fields within the message. The system provides flexibility to define a message structure either in a "top down" mode (starting with the general structure of the message and working down to its individual fields), or in a "bottom up" mode (starting with the individual fields and working up to the message's general structure).

A block diagram of a preferred overall system for implementing the invention is given in FIG. 3. A computer display screen 16 provides a graphical display interface that allows an operator to condition software within the central processing unit (CPU) 18 to receive messages which have a structure defined by means of the graphical display. The graphical display is preferably of the WINDOWS-type, allowing message structure descriptors to be selected by means of a "point and click" mouse, and specific descriptor information to be entered with a keyboard; the keyboard and mouse are collectively indicated by reference number 20. They communicate with the graphical display through the CPU's operating software 22 in the normal fashion.

The CPU 18 is programmed with a translation software program 24 that is coded in accordance with the particular message processor 28. This translation software translates the message structures to a language that is recognizable by the auto coder software module 30, which is preferably programmed into the same CPU. Messages 26 are processed by the software generated by the standard auto coder software module 30. A suitable auto coder program has been developed under the acronym PRISM (prototype reusable integrated software modules), and described in Hughes, "DOD Changes Procurement Strategy For Software To Drive Command Centers", *Aviation Week & Space Technology*, Aug. 26, 1991, page 56.

The nature of the translation software 24 will depend upon the particular message processor and auto coder for which message processor 28 is designed. Translation software for a given system would need to be written based upon these criteria. However, this is a one-time operation that is within the capabilities of a skilled software writer. Once the initial translation software has been prepared, it does not have to be manually rewritten each time the message structure changes; rather, it can accommodate a wide range of different message structures, which are input into the system through the easy-to-use graphical display 16. This is a very substantial advantage over the prior approach of using a skilled engineer to redescribe the message structure, in the message processor language, every time the structure is changed.

Once the translation software 24 has been written, any message structure can be translated into a language that is compatible with the auto coder 30 and message processor 28. In response to incoming messages, an output 32 is produced by the message processor, typically in the form of display and/or data base information to track the aircraft that was the subject of the most recent message.

A preferred organizational scheme of various descriptors that can be inputted to the graphical display 16 to define different message structures will now be described. Although reference will be made to the air traffic control message structure illustrated in FIG. 1, this organizational scheme is applicable in general to many different types of messages.

At its highest level, the message is structured into individual fields, groups of fields, and subgroups within the groups. FIG. 4 illustrates options that can be displayed on the screen of the graphical display 16 that allow the operator to define whatever fields and groups/subgroups of fields are necessary to describe the structure of the messages to be processed. The two options shown are ADD FIELD 34, and ADD GROUP 36. The operator uses the mouse to point to whichever option is desired.

FIG. 5 shows an example of a display screen that can appear in response to the selection of the ADD FIELD option. This screen displays various field descriptors such as field name 37, length 38 (fixed or variable), type 40, sequential range of legal values 42, and non-sequential table of legal values 44.

Various options for defining the TYPE of field are illustrated in FIG. 6. These options are displayed by selecting the TYPE descriptor 40. In this illustration, the type of characters within the field under consideration can be specified as being alpha (mixed upper and lower case) 50, upper case only 52, lower case only 54, alphanumeric 56 or numeric 58. Selecting the LEGAL VALUES descriptor 42 opens up a table into which a list of permissible values for the field can be entered through the keyboard.

Once the operator is done describing the field, he would select the OK button which clears the field definition screen and adds the field to the message structure. He then defines the item ATTRIBUTES as shown in FIG. 7. It consists of the following descriptors: MANDATORY 60 (indicating that the particular field must be present in the message), CONDITIONAL 62 (indicating that the value of the field entry is dependent upon some previous information) optional 63 (omitted from the message), SINGLE 64 (indicating that the field is non-repeating), and repetitive 65 (indicating that the field repeats). In the absence of specific selections, the system defaults to MANDATORY and SINGLE. If a CONDITIONAL field is specified, the user can enter the conditional information through another display.

Figure 8:
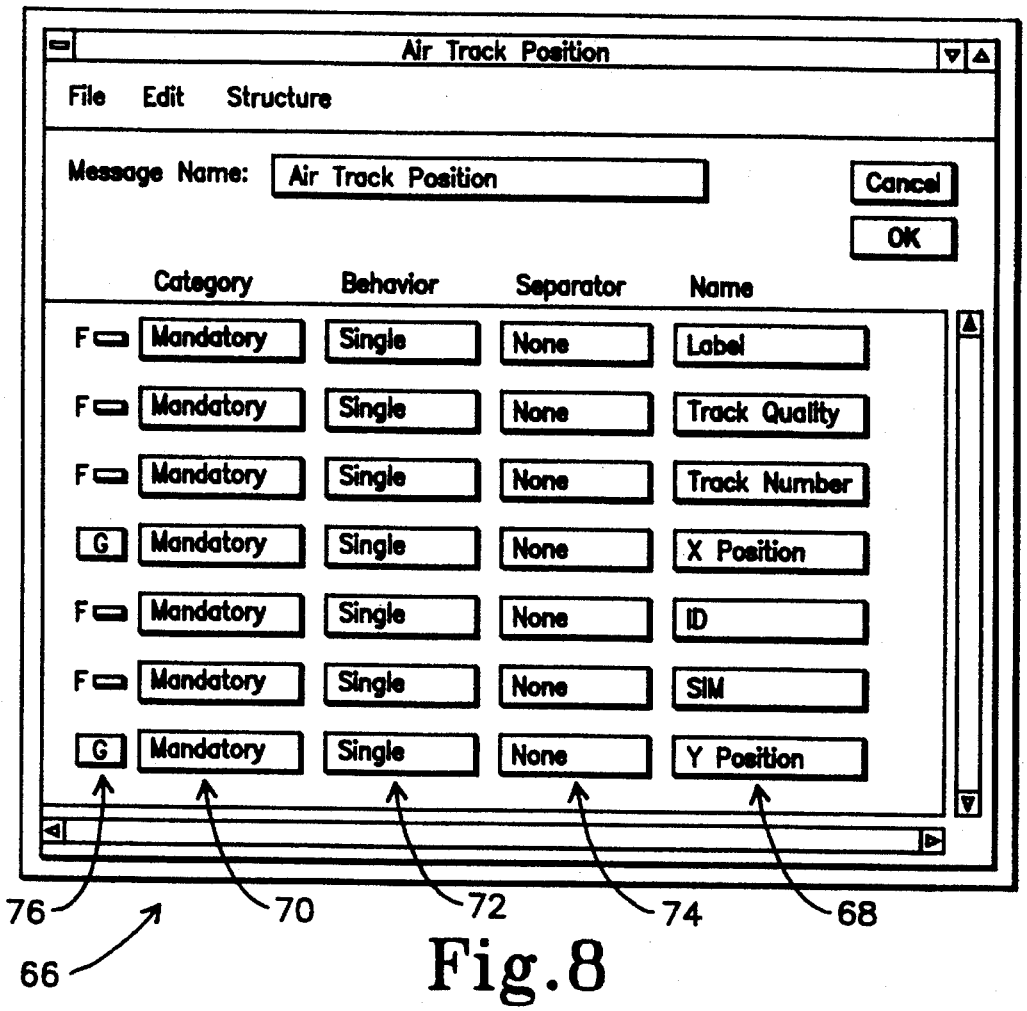
FIG. 8 shows a screen display with a graphical display of options for structuring field attributes.

A replica of a display that can be presented on the user interface graphical display screen 66 for the specification of various item ATTRIBUTES is presented in FIG. 8. In this display, the names of the various fields in the exemplary message structure of FIG. 1 are displayed in column 68. For each field, its "Category" (MANDATORY/OPTIONAL/ CONDITIONAL) is specified by the operator in column 70, while its "Behavior" (single or repeating) is specified in column 72 by means of pull down menus. If the field has been defined as having a variable length, the "Separator" character that is used in the message to indicate the end of the field in entered in column 74; in the given illustration, none of the fields are variable.

Finally, icons are presented in column 76 that allow each field to be identified as a single field (F) or a group (G) of fields. It can be seen that in this example the "X Position" and "Y Position" items are actually groups of fields. This corresponds to the example of FIG. 1, in which the X Position item 8 specifies both direction (the first bit) and absolute position (the remaining 13 bits); a similar organization is provided for the Y Position item 14. Describing these two categories of information (direction and absolute position) as two fields within an overall group allows the message processor to extract and process the two fields separately.

Figure 9:
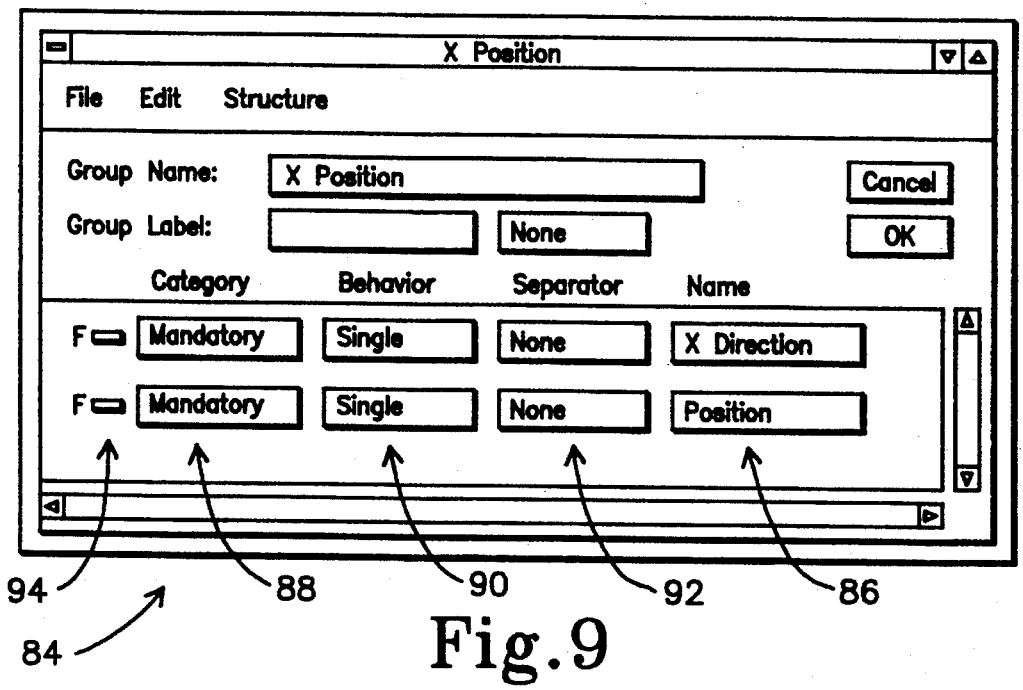
FIG. 9 shows a screen display with a graphical display of options for structuring a group of fields by the field attributes.

FIG. 9 shows an example of a display screen 84 that can appear in response to selecting the ADD GROUP option 36 to specify the particular fields within a given group. In this example, the group name is entered as "X Position". The screen is organized in a manner similar to the message definition screen of FIG. 8, displaying the names of the various items within the group (column 86), whether the items are mandatory, optional or conditional (column 88), whether the items are single or repeating (column 90), the identification of any separators used for variable length items (column 92) and also whether the item is a field or a subgroup (column 94).

The graphical display 16 can be controlled with a traditional WINDOWS program, or with numerous variations such as MOTIF by Open System Foundation, OPEN LOOK by Sun Microsystems, Inc. or X-WINDOWS by Massachusetts Institute of Technology. Numerous other "point and click" options may be developed in the future, and the invention is also applicable to other kinds of graphical displays that may be developed but are not of the "point and click" variety. Any graphical display that allows for operator entry of the message structure descriptors without a detailed knowledge of the message processor language would be suitable.

Once a particular message structure has been inputted to the system, later changes in the structure of incoming messages can easily be accommodated by using the graphical display and the translation software. By definition, the invention is applicable to formatted messages (i.e., messages with a known structure); it is not suitable for unformatted messages in which the message structure is not known in advanced.

The invention has been described thus far in connection with the provision of translated messages that bears substantive information on the outside environment. Other applications also exist, such as when the message fields are defined by "templates", and corresponding "co-templates" are used to validate the information in the basic fields. Using the example of a "track quality" field, the co-template might provide validating information such as the length of the field, ranges of permissible data, etc. The present invention can be used to supply the key information for the co-templates.

While illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of enabling a message processor to process messages having a user-determined message structure, said message processor having a known message processing language and a coder which is pre-programmed to input a predetermined message processing function into the message processor to process said messages, comprising:

displaying a set of message structure descriptors on a graphical display, defining said user-determined message structure on said graphical display in terms of said message structure descriptors, translating the message structure thus defined into a language that is recognizable by said coder, and generating message processing software for said message processor with said coder in response to said translated message structure to enable said message processor to perform said predetermined function upon messages having said user-defined message structure.

2. The method of claim 1, wherein said message structure descriptor set includes a plurality of message field descriptors.

3. The method of claim 2, wherein said field descriptors include field length and field type descriptors.

4. The method of claim 3, wherein said field a table of permissible field values.

5. The method of claim 3, wherein said field length descriptor provides for fixed and variable length fields.

6. The method of claim 3, wherein said field type descriptor provides for upper case, lower case, mixed upper and lower case, numeric and alphanumeric fields.

7. The method of claim 2, wherein said set of message structure descriptors allow for mandatory, optional, and/or conditional fields.

8. A method of processing messages formatted in accordance with a desired message structure with a message processor that has a known message processing language and a coder which is pre-programmed to input a predetermined message processing function into the message processor, comprising:

displaying a set of descriptors that allows a user to define said desired message structure, translating a user-defined message structure to a language that is recognizable by said coder, generating message processing software for said message processor with said coder in response to said translated message structure to enable said message processor to perform said predetermined function upon messages having said user-defined message structure, and processing a message formatted with said user-defined message structure in said message processor with said message processing software.

9. The method of claim 8, wherein said descriptor format includes a plurality of field descriptors.

10. A system for processing formatted messages having a user-determined message structure with a message processor that has a known message processing language and a coder which is pre-programmed to input a predetermined message processing function into the message processor, comprising:

a graphical display device, at least one user controlled input device, a computer that is connected to control the display presented by said graphical display device, said computer being programmed to:
  a) display on said graphical display device a set of message structure descriptors,
  b) define said user-determined message structure in terms of said message structure descriptors in accordance with user inputs to said input device,
  c) translate the message structure thus defined into a language that is recognizable by said coder,
  d) generate message processing software for said message processor with said coder in response to said translated message structure to enable said message processor to perform said predetermined function upon messages having said user-defined message structure, and
  e) process a message formatted with said user-defined message structure in said message processor with said message processing software, and
a message input connected to supply messages with said user-defined message structure to said message processor.

11. The system of claim 10, wherein said computer is programmed to cause said graphical display device to display said message structure descriptor set as a plurality of field descriptors.

12. The system of claim 11, wherein said field descriptors include a message length descriptor and a message type descriptor.

13. The system of claim 11, wherein said field descriptors include a table of permissible field values.

14. The system of claim 11, wherein said field descriptors include a selection between fixed and variable field lengths.

15. The system of claim 11, wherein said field descriptors include a type descriptor offering a selection among upper case, lower case, mixed upper and lower case, numeric and alphanumeric characters.

16. The system of claim 11, wherein said field descriptors include a selection for optional, mandatory, and/or conditional fields.

* * * * *